(12) United States Patent
Egorova et al.

(10) Patent No.: US 9,117,266 B2
(45) Date of Patent: Aug. 25, 2015

(54) METHOD AND APPARATUS FOR DYNAMICALLY VISUALIZING A COLLECTION OF IMAGES IN THE FORM OF A COLLAGE

(71) Applicant: SAMSUNG ELECTRONICS CO., LTD., Suwon-si (KR)

(72) Inventors: Marta Egorova, Moscow (RU); Ilia Safonov, Moscow (RU); Gnana Sekhar Surneni, Suwon-si (KR); Min-suk Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 13/680,737

(22) Filed: Nov. 19, 2012

(65) Prior Publication Data

US 2013/0129139 A1      May 23, 2013

(30) Foreign Application Priority Data

Nov. 17, 2011   (RU) .................................. 2011146620
Jul. 2, 2012    (KR) ......................... 10-2012-0071983

(51) Int. Cl.
*G06K 9/00*      (2006.01)
*G06T 7/00*      (2006.01)
*G06T 13/80*     (2011.01)
*G06T 11/60*     (2006.01)

(52) U.S. Cl.
CPC .............. *G06T 7/0024* (2013.01); *G06T 11/60* (2013.01); *G06T 13/80* (2013.01)

(58) Field of Classification Search
None
See application file for complete search history.

(56) References Cited

U.S. PATENT DOCUMENTS

| 7,346,212 | B2 | 3/2008 | Cheatle |
| 7,576,755 | B2 | 8/2009 | Sun et al. |
| 7,848,596 | B2 | 12/2010 | Widdowson |
| 7,904,455 | B2 | 3/2011 | Chiu et al. |
| 8,013,874 | B2 | 9/2011 | Reid et al. |
| 2002/0040375 | A1 | 4/2002 | Simon et al. |

(Continued)

FOREIGN PATENT DOCUMENTS

| KR | 10-1993-0022186 A | 11/1993 |
| KR | 10-1994-0012179 A | 6/1994 |

OTHER PUBLICATIONS

International Search Report and Written Opinion dated Mar. 29, 2013 issued by the International Searching Authority in counterpart International Application No. PCT/KR2012/009733 (PCT/ISA/210 & PCT/ISA/237).

(Continued)

*Primary Examiner* — Hadi Akhavannik
(74) *Attorney, Agent, or Firm* — Sughrue Mion, PLLC (57) ABSTRACT

A method and apparatus of presenting a collection of images in the form of a collage is provided. The method dynamically visualizes the collection of images in the form of a collage. The method includes receiving the image from the collection of the images; adjusting parameters of dynamic visualization; analyzing distribution of colors in local areas of the images and the collage; modifying the image by adding the decorative elements of which the appearance depends on the distribution of colors in the local areas of the images and the local areas of the collage; modifying the collage by changing an appearance of decorative elements in the image; determining a position of the modified image on the modified collage; and generating a sequence of frames showing an occurrence of the modified image in the collage.

17 Claims, 6 Drawing Sheets

(56) References Cited

U.S. PATENT DOCUMENTS

2002/0140981 A1    10/2002   Takemoto
2006/0181736 A1*   8/2006   Quek et al. .................. 358/1.18
2006/0206811 A1*   9/2006   Dowdy ........................ 715/526
2008/0155422 A1    6/2008   Manico et al.
2008/0193048 A1*   8/2008   Sun et al. ...................... 382/284

OTHER PUBLICATIONS

Communication dated May 23, 2014 from the Korean Intellectual Property Office in a counterpart Korean application No. 10-2012-0071983.

* cited by examiner

METHOD AND APPARATUS FOR DYNAMICALLY VISUALIZING A COLLECTION OF IMAGES IN THE FORM OF A COLLAGE

CROSS-REFERENCE TO RELATED PATENT APPLICATION

This application claims the benefit of Korean Patent Application No. 10-2012-0071983, filed on Jul. 2, 2012, in the Korean Intellectual Property Office, and Russian Patent Application No. 2011146620, filed on Nov. 17, 2011, in the Federal Institute of Industrial Property, the disclosure of which is incorporated herein by reference, in its entirety.

BACKGROUND

1. Field

Methods and apparatuses consistent with exemplary embodiments relate to a method of presenting a collection of images. More particularly, to visualizing a collection of images in the form of a collage, with the application of decorative elements containing colors which depend on visualized images.

2. Description of the Related Art

Related art technology includes a plurality of sources which describe many methods and systems relating to the transformation of a collection of images into a static image in the form of "collage". Such conventional technology may be classified into two groups: (1) automatic or automated methods and (2) systems with tools for the manual creation of a collage. The majority of patents and publications relating to automatic creation of a collage, deal with the processes of selection, grouping and arrangement of images. For example, in the U.S. Pat. No. 7,576,755, a method of allocation of significant areas and arrangement of images on a canvas is described. The method of allocation and arrangement of images is under the condition of display of the maximum part of the significant area of the image. A Bayesian Classifier is used for this purpose. U.S. Pat. No. 7,848,596 is based on use of templates for arrangement of a set of images. The total collage of similar systems, as a rule, requires updating, by a user, for creation of an aesthetically pleasant collage. In the U.S. Pat. No. 7,904,455, use of a collage in the form of a mosaic for navigation among images is described. For visual separation of groups of images from each other, the representative images of each group are divided by borders in a collage. The border type, color, and thickness are used for setting the relationship between groups: namely, the greater distinction between groups of images, the more the borders between them are distinctive.

A slide show in the form of a collage is also a known method of presentation of a collection of images. For example, Apple® iPhoto® (see the U.S. Pat. No. 8,013,874) possesses a built-in mode of display of a slide show in the form of a collage: images "fall" on a canvas one after another. Some fixed set of decorative elements, for example, a white framework, is thus available.

For creation of more impressive slide shows in the form of a collage, one should use special programs of an autoring, such as CyberLink® PowerDirector® (see http://en.wikipedia.org/wiki/PowerDirector). Automatically generated collages are seldom accompanied by decorative elements, such as texts, backgrounds and frameworks. This can be partly explained by the fact that in some cases, decorative elements are poorly combined, by color. These images result in a negative perception of the collages generated by a user.

Often images are manually or automatically disposed in the form of a collage. Then such elements as texts or other decorative elements are manually introduced and their parameters are adjusted (for example, a font, a size, a transparency intensity, a saturation, a color). Manual decoration of a collage takes considerable time. Change of parameters of decorative elements, as a rule, requires special skills, which include for example, the ability to aesthetically select the matching colors and a combination of various decorative elements.

From one of the related art methods and systems for manual creation of a collage is the program Picture Collage Maker (<http://www.picturecollagesoftware.com>). This offers a set of templates for image placing and a set of decorative elements, such as frameworks, masks, shades, drawings and backgrounds. The drawback of such systems occurs because they are focused exclusively on experienced users who are engaged in the creation of personal collages.

SUMMARY

Exemplary embodiments provide a method and apparatus for dynamically visualizing a collection of images in the form of a collage.

According to an aspect of an exemplary embodiment, there is provided a method of dynamically visualizing a collection of images in the form of a collage, the method including: receiving an image from the collection of the images; adjusting parameters of dynamic visualization; analyzing a distribution of colors in local areas of the images and the collage; modifying the image by adding decorative elements of which the appearance depends on the distribution of colors in the local areas of the images and the collage; modifying the collage by changing the appearance of decorative elements in the image; determining a position of the modified image on the modified collage; and generating a sequence of frames showing occurrence of the modified image in the collage.

The parameters of dynamic visualization may be set as one of a size of the collage, a collage background, a way of placing images, a set of decorative elements, a way of changing the appearance of decorative elements, color preferences and a set of metadata of the image.

The modification of the image may be performed by the addition of decorative elements chosen from the group including frameworks, borders and drawings.

In generating the sequence of the frames, the decorative elements of the collage and the colors of the decorative elements of images in the collage may be changed in a smooth or sharp fashion.

In the analyzing of the distribution of the colors, the local areas of the image and of the collage may be determined depending on the types of the decorative elements, the parity of the sizes of the decorative elements, the image and the collage.

In the determining of the disposition of the modified image in the modified collage, the size of the image may vary within a range preset by a user.

According to an aspect of another exemplary embodiment, there is provided an apparatus which dynamically visualizes a collection of images in the form of a collage, the apparatus including: an image receiver which receives an image from the collection of images; a parameter adjuster which adjusts parameters of dynamic visualization; an analyzer which analyzes distribution of colors in local areas of the collage and in local areas of the image; an image modifier which modifies an image by adding decorative elements which appears according to distribution of colors in the local areas of the collage and in the local areas of the image; a collage modifier which modifies a collage by changing the appearance of the decorative elements in the image; a position determiner which determines a position of the image modified in the modified collage; and a frame sequence generator which generates a sequence of frames which represents generation of the modified image in the collage.

The parameters of dynamic visualization may be set as one of a size of the collage, a collage background, a way of placing images, a set of decorative elements, a way of changing the appearance of decorative elements, color preferences and a set of metadata of the image.

The image modifier may modify an image by the addition of decorative elements chosen from the group including frameworks, borders and drawings.

In the frame sequence generating unit, the decorative elements of the collage and the colors of the decorative elements of images in the collage may be changed in a smooth or sharp fashion.

In the analyzing unit, the local areas of the image and the local areas of the collage may be determined depending on the types of the decorative elements and also depending on the parity of the sizes of the decorative elements, the image and the collage.

In the position determiner, the size of the image may vary within a preset range set by a user.

According to an aspect of another exemplary embodiment, there is provided a computer readable recording medium having embodied thereon a computer program for executing the method of the inventive concept.

BRIEF DESCRIPTION OF THE DRAWINGS

The above and other aspects will become more apparent by describing in detail exemplary embodiments thereof with reference to the attached drawings in which.

DETAILED DESCRIPTION

Expressions such as "at least one of," when preceding a list of elements, modify the entire list of elements and do not modify the individual elements of the list.

Exemplary embodiments will now be described more fully with reference to the accompanying drawings.

The terms used in this detailed description are selected from among common terms that are currently widely used in consideration of their function in the inventive concept. However, the terms may be changed according to an understanding by one of ordinary skill in the art, a precedent within the technology, or the advent of new technology. Also, in particular cases, the terms are discretionally selected by the applicant of the inventive concept, and the meaning of those terms will be described in detail in the corresponding portion of the detailed description. Therefore, the terms used therein are not merely designations of the terms, but the terms are defined based on the meaning of the terms and content throughout the inventive concept.

Throughout the present application, when a part "includes" an element, it is to be understood that the part additionally includes other elements rather than excluding other elements as long as there is no particular recitation excluding additional elements. Also, the terms such as " . . . unit", "module", and the like used herein indicate a unit, which processes at least one function or motion, and the unit may be implemented by hardware or software, or by a combination of hardware and software.

The exemplary embodiments will now be described more fully with reference to the accompanying drawings for one of ordinary skill in the art to be able to readily perform the inventive concept. The inventive concept may, however, be embodied in many different forms and should not be construed as being limited to the exemplary embodiments set forth herein. Rather these exemplary embodiments are provided so that this disclosure will be thorough and complete, and will fully convey the inventive concept to those of ordinary skill in the art. Also, parts in the drawings unrelated to the detailed description are omitted to ensure clarity of the exemplary embodiments. Like reference numerals in the drawings denote like elements. As used herein, the term "and/or" includes any and all combinations of one or more of the associated listed items.

The exemplary embodiments provide transforming a set of images into a collage. Such method should be aimed at an average level user and must provide a wide spectrum of variants of visual decoration of created collages.

Figure 1:
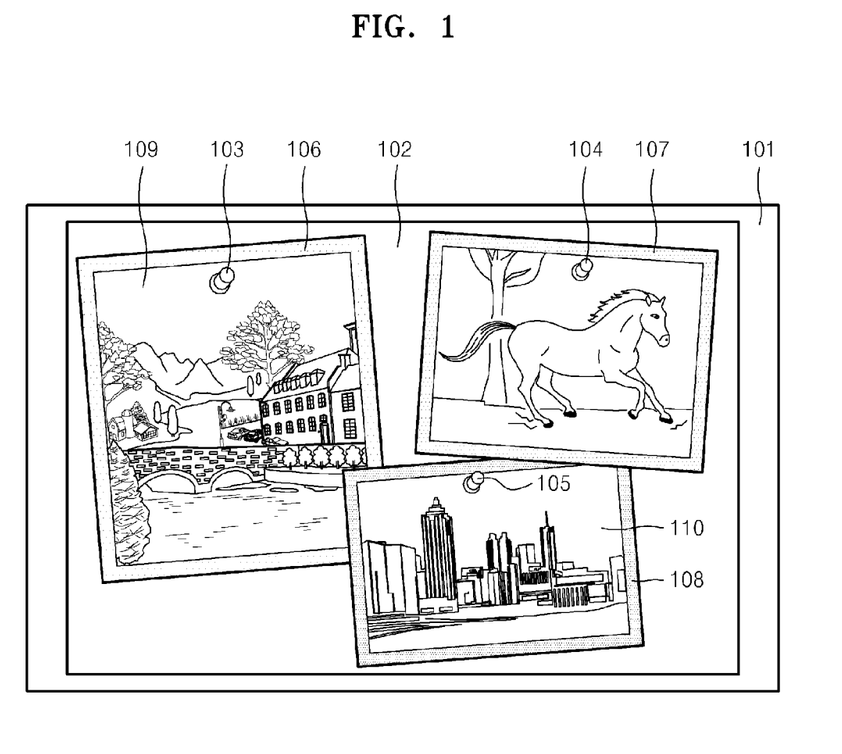
FIG. 1 illustrates an example of one frame of a slide show in the form of a collage with decorative elements, the appearance of which depends on the colors of the images shown, according to an exemplary embodiment.

In FIG. 1, one frame of a slide sequence is shown in the form of a collage with decorative elements, of which the appearance depends on colors of the visualized images. Decorative elements may be applied not only to images in the collage, but also to the collage itself. For example, a decorative element may be a rectangular framework 101. Appearance 102 of a background and the decorative element 101 of the collage may change in the course of dynamic visualization of a collection of images. At the stage of modifying an image or a collage by addition of decorative elements, these elements are selected from the following group: frameworks, borders, drawings, for example, drawing pins, magnets on a refrigerator, etc. As decorative elements of images in FIG. 1, writing buttons 103, 104, and 105 and frameworks 106, 107, and 108 are shown. Different numerical values for decorative elements of one type specify that the decorative elements represent different colors from each other. The choice of colors of a decorative element is based on preferences of the user and the specified color scheme. For example, if the complementary scheme of a combination of colors is used for a dark image 109, then the corresponding framework 106 should be light, and, on the contrary, for a light image 110, the framework 108 around the light image should be dark.

Figure 2:
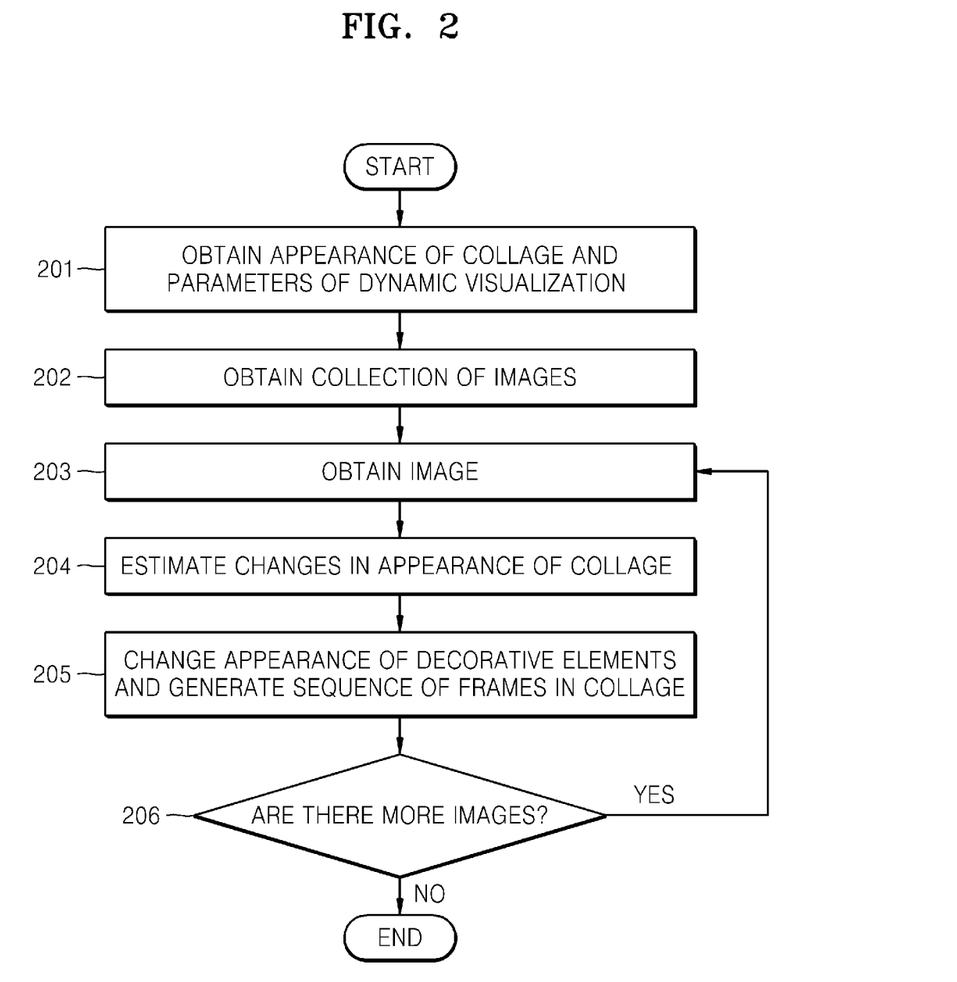
FIG. 2 represents a flow chart of a process of dynamic visualization of a collection of images in the form of a collage, with change of the appearance of decorative elements according to an exemplary embodiment.

In FIG. 2, a flow chart of a process of dynamic visualization of a collection of images in the form of a collage with change of appearance of decorative elements is shown. Initially, parameters of dynamic visualization in the form of a collage are obtained in operation 201. The following parameters of dynamic visualization are set: a size of the collage, a collage background, a way of placing images, a set of decorative elements, a way of changing the appearance of decorative elements, color preferences, a set of metadata of the image, such as time and date of shooting, a shooting place and a file name. The parameters may be manually or automatically preset by the user. In operation 202, the user chooses images for dynamic visualization in the form of a collage. The module of visualization gets access to the image in operation 203 and in operation 204 carries out an estimation of changes which are necessary in the collage. In operation 205, the basis of the analysis of the collage in operation 204, the sequence of frames of representation of the given image in the collage according to parameters in operation 201. At the stage of determination of the site of the modified image in the modified collage, the size of the image varies according to some range. All images chosen in operation 202 are processed similarly. In operation 206, a determination is made as to whether there are more images. If there are more images, the process proceeds to operation 203. If there are no more images, the process ends.

Figure 3:
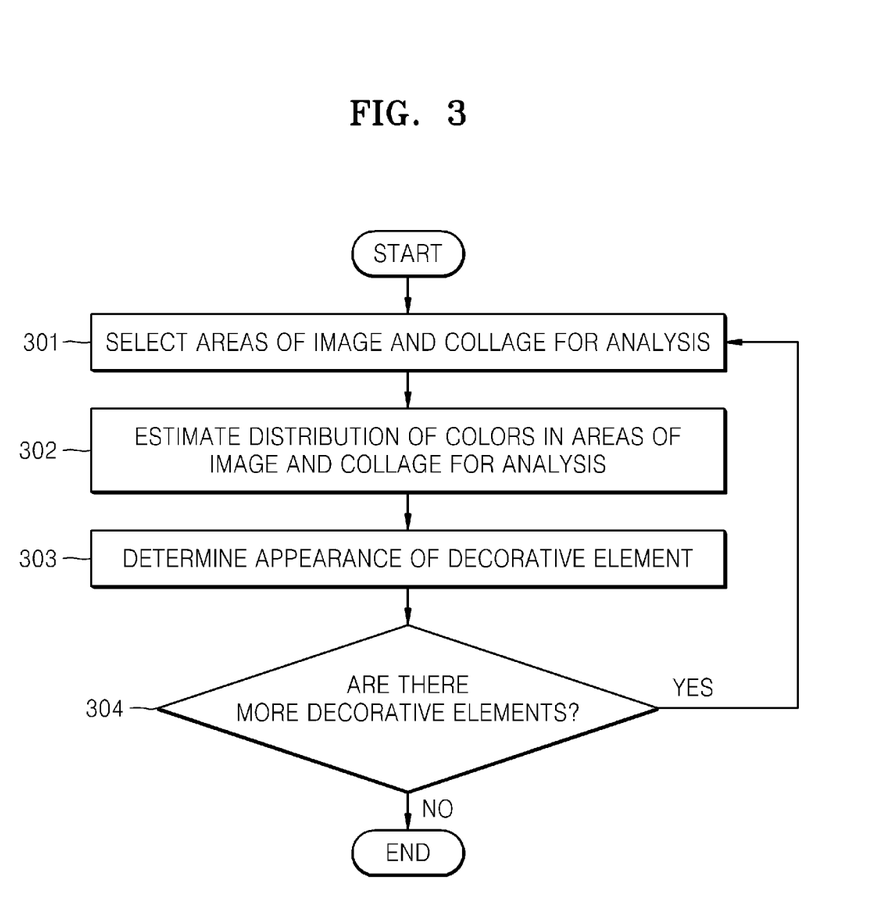
FIG. 3 represents a flowchart of an evaluation of changes of colors of decorative elements according to an exemplary embodiment.

Addition of the new image in a collage results in a change in the appearance of decorative elements of images in a collage and decorative elements of the collage. The process of estimating the changes in the appearance of decorative elements is shown in FIG. 3. In operation 301, the areas of the disposed image and of the collage are selected for analysis. As an area for the analysis, one may consider the whole image and one may consider the whole collage. In some variants of realization of the inventive concept, it is not necessity to consider the complete image or the collage. The manner of placing images in the collage, selected in operation 301 of FIG. 2, determines the final position of the image in the collage and determines the manner of occurrence of the image, for example, rotation, display, change of size during dynamic visualization. Thus, the position of the decorative elements of the given image in the collage is known. For example, the illustration of the writing button used as a decorative element, defines the image area over which it is disposed. Thus, the color of the given drawing depends on the colors of the image in the local area in which it is disposed. In another variant of the exemplary embodiment, the areas for the analysis are determined on the basis of neighboring areas in relation to the position of a decorative element. For example, the framework may separate the image from the rest of the contents of the collage. In this case, the color of the framework should be determined not only by the collage area over which it is disposed, but the colors of the image and the color of the collage around it, should also be considered. Some search criteria may be used for the analyzed areas. The color characteristics are calculated in operation 302. The histogram of colors is the most common feature or characteristic. The prevailing color and/or distribution of colors along the main axis of the decorative element may also be considered on the basis of the calculated features. In operation 303, the color of the decorative element is determined on the basis of the calculated features. In some variants of the claimed exemplary embodiment, the number of colors of the decorative element may be one or more. The choice of color of a decorative element on the basis of the calculated feature is performed in accordance with the parameter of color preference, as determined in operation 201. In operation 304, a determination is made as to whether there are more decorative elements. If there are more decorative elements, the process proceeds to the step 301, or the process ends.

Figure 4:
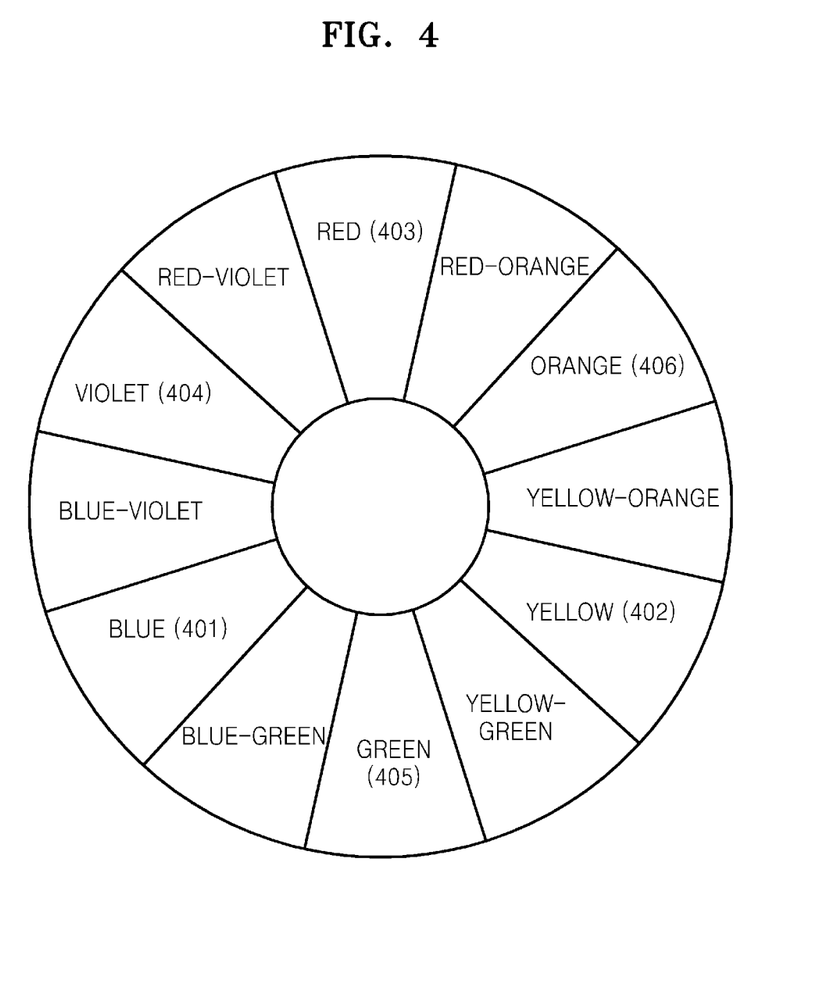
FIG. 4 illustrates an example of a color wheel according to an exemplary embodiment.

FIG. 4 shows a color wheel. Twelve colors are located on a wheel: three primary colors (red 403, yellow 401, dark blue 402); three minor colors (violet 404, green 405, orange 406); and six tertiary colors. The following basic schemes of combining the colors are known: a monochromatic combination scheme, a complementary combination scheme, and a triad combination scheme. In a complementary combination scheme, the color of the decorative element is selected as an opposite primary color to the color in the color wheel in the analyzed area. In case of several areas, the triad model of a combination of colors is generally used. For example, two areas are considered, i.e. two prepotent colors are selected, and the color of the decorative element is determined as equidistant, in the color wheel, from the prepotent colors of the specified areas. There are two such points in the wheel. In case where a monochromatic combination of colors on a collage is chosen, the smaller sector of the color wheel determines the color of the decorative element, and in case where a complementary combination is chosen, the color of the decorative element is set by the larger sector.

Figure 5:
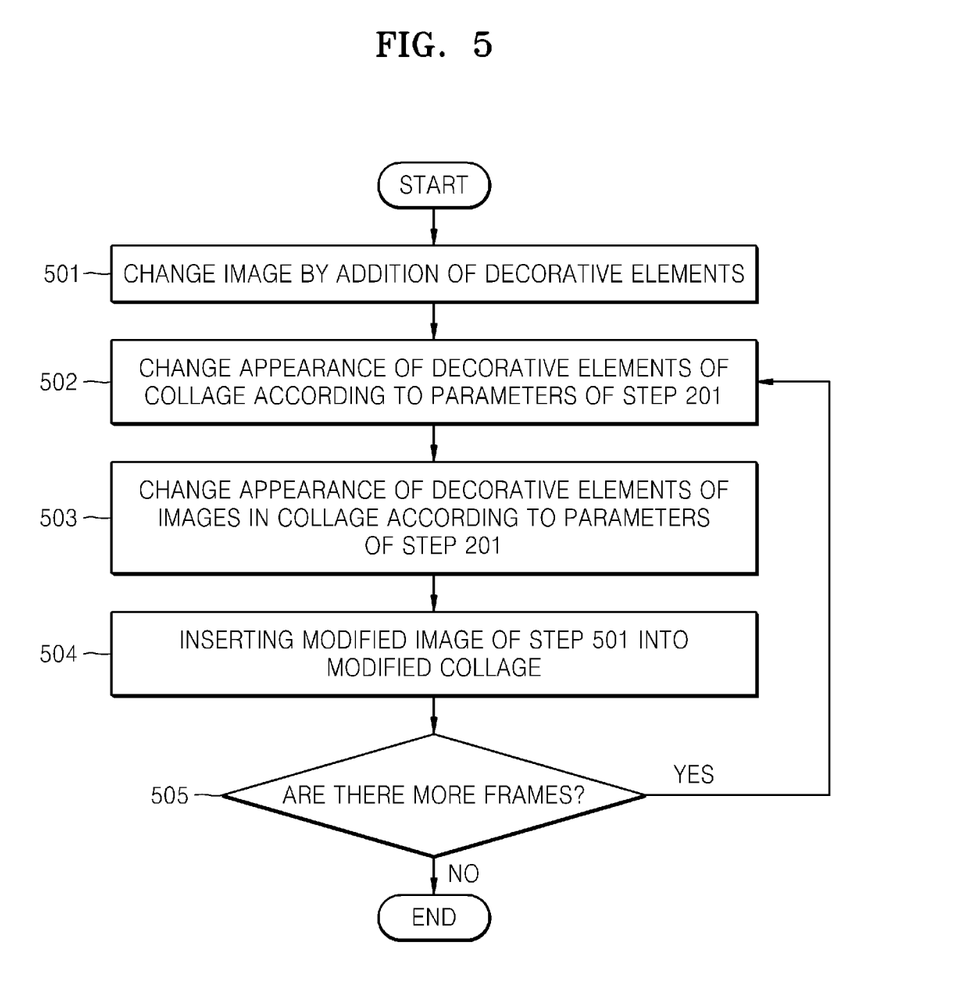
FIG. 5 represents a flowchart of a process of formation of sequence of frames with change of decorative elements, according to an exemplary embodiment.

In FIG. 5, a flow chart of the process of forming the sequence of frames with adjustment of the appearance of the decorative elements, is shown. In the step 501, the image added to the collage may be changed by fixing decorative elements to the image. The way of changing the appearance of the decorative elements, set in operation 201, may determine the change of the appearance of the decorative elements of images in the collage and the decorative elements of the collage. Also, at the stage of arranging the sequence of frames, the colors of the decorative elements of the collage and that of the images in the collage are smoothly changed (from frame to frame) or are changed in a sharp fashion (within the next frame). In the modification illustrated in FIG. 5, the appearance of the decorative elements of the image added in a collage, may not change. The appearance of the decorative elements of the collage and of the images in the collage is changed from the frame in operation 502 to the frame in operation 503. The nature of changes of the appearance of the decorative elements is set in the step 201. The result of the integration of the image modified in the step 501, and of the collage, is shown in operation 504. In the step 505, a determination is made as to whether there are more frames. If there are more frames, the process proceeds to the step 502. If there are no more frames, the process ends.

Figure 6:
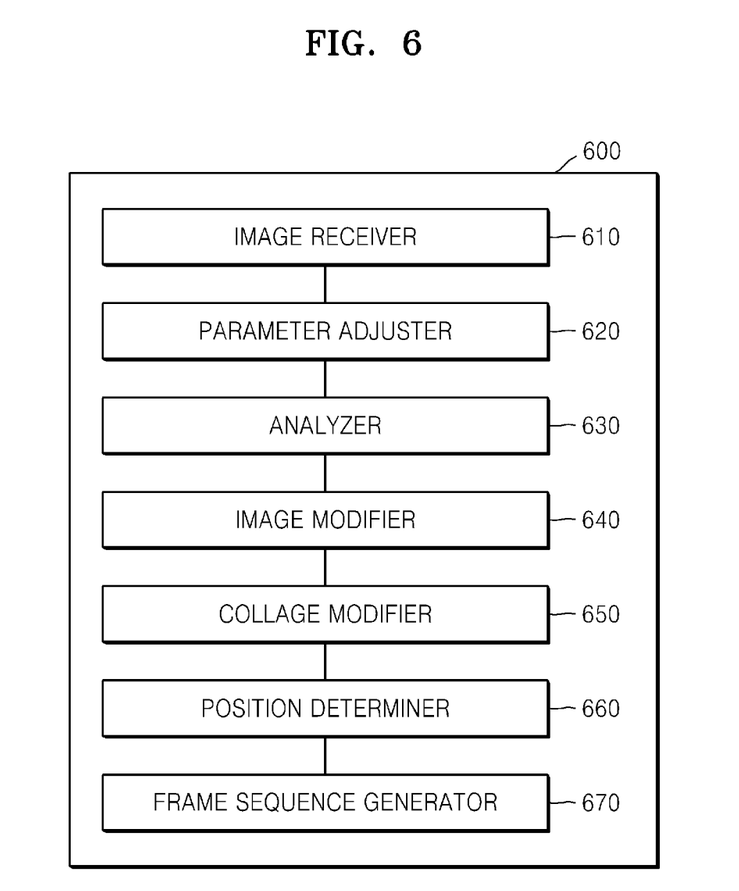
FIG. 6 represents a block diagram of an apparatus which dynamically visualizes a collection of images in the form of a collage according, to an exemplary embodiment.

FIG. 6 shows an apparatus for dynamically visualizing a collection of images in the form of a collage according to an exemplary embodiment.

The apparatus 600 may include an image receiver 610 which receives an image from the collection of the images, a parameter adjuster 620 which adjusts parameters of dynamic visualization, an analyzer 630 which analyzes distribution of colors in local areas of the collage and in local areas of the image, and an image modifier 640 which modifies an image by adding decorative elements which appear according to distribution of colors in the local areas of the collage and in the local areas of the image.

The apparatus 600 may further include a collage modifier 650 which modifies a collage by changing the appearance of the decorative elements in the image, a position determiner 660 which determines a position of the image modified in the modified collage, and a frame sequence generator 670 which generates a sequence of frames representing generation of the modified image in the collage.

According to an exemplary embodiment, the parameters of dynamic visualization are set as one of a size of the collage, a collage background, a way of placing images, a set of decorative elements, a way of changing the appearance of decorative elements, color preferences and a set of metadata of the image.

The image modifier 640 may modify an image by the addition of decorative elements selected from the group consisting of frameworks, borders and drawings.

In the frame sequence generator 670, the colors of the decorative elements of the collage and that of the images in the collage are smoothly changed or are changed in a sharp fashion.

In the analyzer 630, the local areas of the collage and the local areas of the image may be determined depending on the type of the decorative element and may also be determined depending on the parity of sizes of the collage, the image and the decorative element.

In the position determiner 660, the size of the image may vary within a preset range set by a user.

The description with respect to the above-described method may be applied to the apparatus 600. Thus, a repeated description with respect to the above-described method with respect to the apparatus 600 will be omitted.

The exemplary embodiments of the inventive concept can be written as computer programs and can be implemented in general-purpose digital computers that execute the programs using a non-transitory computer readable storage medium. When the general purpose computer executes the program, the computer becomes a special purpose computer. Examples of the computer readable recording medium include magnetic storage media (e.g., ROM, floppy disks, hard disks, etc.), optical recording media (e.g., CD-ROMs, or DVDs), etc.

The exemplary embodiments are industrially applicable in display devices, such as TVs from multimedia capabilities, mobile phones, digital cameras, photoframeworks, and also in applications for desktop computers for navigation among images, as well as from viewing images in the form of a slide show.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of dynamically visualizing a collection of images in the form of a collage, the method comprising:
    setting parameters of dynamic visualization relating to a collage including a decorative element;
    receiving an image from the collection of the images;
    analyzing a distribution of colors in the received image and the collage;
    changing the decorative element according to the distribution of colors in the received image and the collage; and
    generating a sequence of frames including the changed decorative element within the collage,
    wherein the decorative element is separated from the received image.

2. The method of claim 1, wherein the parameters of dynamic visualization are set as one of a size of the collage, a collage background, a way of placing images, a set of decorative elements, a way of changing an appearance of decorative elements, color preferences and a set of metadata relating to the image.

3. The method of claim 1, further comprising adding decorative elements chosen from the group comprising frameworks, borders and drawings.

4. The method of claim 1, wherein in the generating the sequence of the frames, decorative elements of the collage and colors of the decorative elements of images within the collage are changed smoothly or sharply.

5. The method of claim 1, wherein in the analyzing the distribution of the colors, local areas of the image and of the collage are determined based on types of decorative elements and also on parity of the sizes of the decorative elements, the image and the collage.

6. An apparatus for dynamically visualizing a collection of images in the form of a collage, the apparatus comprising:
    an image receiver which receives an image from the collection of the images;
    a parameter adjuster which sets parameters of dynamic visualization relating to a collage including a decorative element;
    an analyzer which analyzes a distribution of colors in the received image and the collage;
    a modifier which changes the decorative element according to the distribution of colors in the collage and the image; and
    a frame sequence generator which generates a sequence of frames including the changed decorative element in the collage,
    wherein the decorative element is separated from the received image.

7. The apparatus of claim 6, wherein the parameters of dynamic visualization are set as one of a size of the collage, a collage background, a way of placing images, a set of decorative elements, a way of changing an appearance of decorative elements, color preferences and a set of metadata relating to the image.

8. The apparatus of claim 6, wherein the modifier adds decorative elements chosen from the group comprising frameworks, borders and drawings.

9. The apparatus of claim 6, wherein in the frame sequence generator, decorative elements of the collage and colors of the decorative elements of images in the collage are changed smoothly or sharply.

10. The apparatus of claim 6, wherein in the analyzer, local areas of the image and of the collage are determined depending on types of the decorative elements and also on parity of the sizes of the decorative elements, the image and the collage.

11. A non-transitory computer readable recording medium having embodied thereon a computer program, wherein the program, when executed by a processor of a computer, causes the computer to execute the method of claim 1.

12. The method of claim 4, wherein the decorative elements of the collage and the colors of the decorative elements of images in the collage are changed smoothly from frame to frame or are sharply changed within a next frame.

13. The apparatus of claim 9, wherein the decorative elements of the collage and the colors of the decorative elements of images in the collage are changed smoothly from frame to frame or are sharply changed within a next frame.

14. An apparatus for dynamically visualizing a collection of images in the form of a collage, the apparatus comprising:
    a parameter adjuster which sets parameters relating to dynamic visualization relating to a collage including a decorative element;
    a modifier which changes the decorative element according to a distribution of colors in the image and the collage;
    a frame sequence generator which generates a sequence of frames including the changed decorative element in the collage,
    wherein the decorative element is separated from the received image.

15. The apparatus of claim 14, wherein in the frame sequence generator, decorative elements of images in the collage and colors of the decorative elements in the collage are changed smoothly or sharply.

16. The apparatus of claim 15, wherein the decorative elements of the collage and the colors of the decorative elements of images in the collage are changed smoothly from frame to frame or are sharply changed within a next frame.

17. The apparatus of claim 14, wherein the parameters of dynamic visualization are set as one of a size of the collage, a collage background, a way of placing images, a set of decorative elements, a way of changing an appearance of decorative elements, color preferences and a set of metadata relating to the image.

\* \* \* \* \*